June 26, 1951     E. L. HARDER     2,558,085
TRANSMISSION SYSTEM PROTECTION BY MICROWAVE RELAYING
Filed Jan. 28, 1949
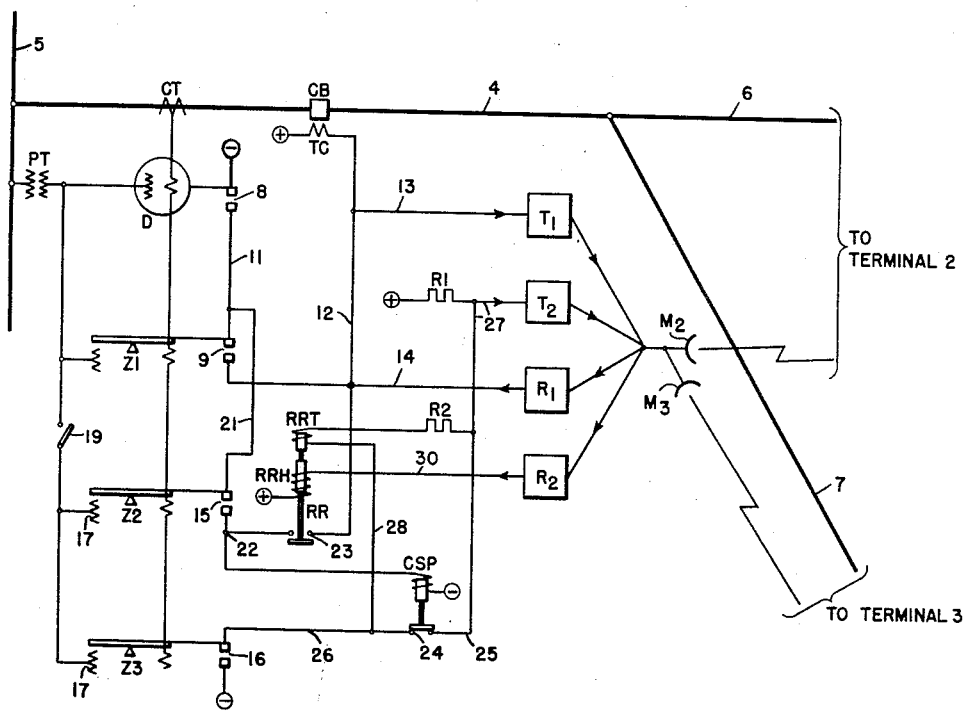
WITNESSES:
Edward Michaels
New. L. Groome
INVENTOR
EDWIN L. HARDER.
BY O. B. Buchanan
ATTORNEY Patented June 26, 1951

2,558,085

UNITED STATES PATENT OFFICE 2,558,085

TRANSMISSION SYSTEM PROTECTION BY MICROWAVE RELAYING

Edwin L. Harder, Pittsburgh, Pa., assignor to Westinghouse Electric Corporation, East Pittsburgh, Pa., a corporation of Pennsylvania Application January 28, 1949, Serial No. 73,328

8 Claims. (Cl. 175—294)

My invention relates to protective systems for commercial-frequency electric-power transmission-systems, for providing an instantaneous indication, at all terminals of a protected line-section of such a system, of the occurence of an internal fault within the protected line-section.

The object of my invention is to provide such a protective fault-responsive relaying-system using one or more microwave channels as a communicating means between the terminals of the protected line-section.

An exemplary form of embodiment of my invention is shown in the accompanying drawing, the single figure of which is a single-line block-diagram of one end of a three-terminal three-phase line-section which is being protected in accordance with my invention.

I will first describe briefly the essential features of the illustrative form of embodiment of my invention, and then I will point out its operation and its advantages over previously known protective relaying systems, together with some observations relative to the general scope of the invention.

The drawing shows diagrammatically the equipment which is installed at one terminal of a three-terminal three-phase 60-cycle transmission-line section 4, which is connected to a bus 5 at the illustrated or relaying terminal, through a circuit breaker CB which is provided with a trip-coil TC. The protected line-section 4 could be either a simple two-terminal line, or a multi-terminal line: it is illustrated as a three-terminal line having a portion 6 which extends to a terminal 2, and having a portion 7 extending to a terminal 3. The relaying equipments which are installed at the three line-terminals are, in general, all alike, so that an illustration and description of one will suffice for all.

The relaying equipment at each one of the terminals comprises a fault-discriminative or fault-detective relaying-means which is responsive to a line-current and a line-voltage at the relaying terminal, and which instantaneously and selectively responds to, or determines the existence of, an internal fault within the protected line-section, without reference to conditions at any other line-terminal. Any kind of relaying-means may be used for accomplishing this purpose, whether it is a single-element relay, or a multi-relay assembly comprising any group of phase and ground relays operating from current and potential transformers CT and PT.

In general, such a fault-responsive relaying-means will have a directional function, for comparing the direction of a line-current relative to a line-voltage at the relaying terminal, and a distance-discriminating function which enables the relaying-means to reach out for a certain distance away from the relaying terminal, said distance being shorter than the distance to the nearest other terminal of the protected line-section. These two functions may be combined into one relaying device, but ordinarily they are separated into separate devices such as a directional element D, which closes its make-contacts 8 when the line-current is flowing in a direction in which it would flow when there is an internal fault on the protected line-section, and a first-zone impedance-element $Z_1$ which closes its contacts 9 when the distance of the fault is less than the distance to the nearest one of the other line-terminals 2 and 3. The two relay-contacts 8 and 9 are serially connected by means of a circuit 11, which connects these contacts between the negative terminal (—) of a station-battery or other source, and a trip-circuit 12 which energizes the trip-coil TC, the other terminal of which is connected to the positive battery-terminal (+).

In accordance with my invention, whenever the trip-circuit 12 is energized, or, in general, whenever a determination is made, at the relaying station, that there exists an internal fault on the protected line-section, a transfer-tripping signal of this fact is transmitted, by way of directed microwave-beams, to all of the other terminals of the protected line-section. To this end, I provide microwave transmitting and receiving equipments $T_1$ and $R_1$, which are connected to mirrors or other directional antenna-means $M_2$ and $M_3$ for beaming a wave to and from the other line-terminals 2 and 3, respectively, this apparatus being intended to be illustrative of any means for getting the transmitted signal from each terminal to each of the other terminals, whether by direct beam, or by the use of intermediate relay-stations for receiving the transmitted beam and transmitting it further on. The transfer-tripping transmitter $T_1$ is indicated, by block-diagram, as receiving its control from a conductor 13 which is connected to the trip-circuit 12. The transfer-tripping receiver $R_1$ is indicated, by block diagram, as delivering a control-impulse through a conductor 14 to the trip-circuit 12.

In many transmission-systems, the apparatus thus far described suffices to adequately protect the protected line-section 4—6—7 against internal faults. In some cases, however, it may not be possible to instantaneously detect the existence of an internal fault at any one of the terminals of the protected line-section, except by comparison with line-conditions existing at some other one or more of the line-terminals. To make my apparatus perfectly general, therefore, so that it will be applicable to practically any kind or condition of transmission-lines, I provide a terminal-comparison fault-detecting scheme, in addition to the first-zone fault-detecting scheme involving the relays D and Z1. This terminal-comparison relay-scheme may involve any protective relaying system in which information is obtained from two or more line-terminals, and compared with each other, before a fault-determination is made.

Such terminal-comparison systems include a direction-comparison system, in which an inlooking direction of line-current at each terminal at which a fault-detector operates (considering each line-current direction with respect to its own terminal voltage), is required before a determination is made that there is an internal fault on the protected line-section; or it could be a phase-comparison system, in which the phase of the line current at one terminal is directly compared with the phase of the line-current at another terminal. An instance of a direction-comparison system is shown in the Lenehan Patent 2,255,934, granted September 16, 1941; while an instance of a phase-comparison system is shown in the Lensner Patent 2,422,570, granted June 17, 1947. As the phase-comparison systems are better adapted for two-terminal lines than for multi-terminal lines, and as it is generally desirable for a relaying system of the sort to which my invention relates to be universally applicable to multi-terminal lines as well as two-terminal lines, I prefer to use a direction-comparison system for the relaying-means which compares the line-conditions at more than one terminal in order to determine the existence of an internal fault on a protected line-section.

In the drawing, therefore, I have indicated a direction-comparison relaying-system which is similar to that which is shown in the Lenehan patent, except that I preferably use a directed microwave-channel, rather than a carrier-current which is superimposed on the line-conductors, as was the case in the Lenehan system. The bare outlines of the essential elements of such a system are shown, by way of single-line block-diagram, in the accompanying drawing, wherein I provide a second-zone impedance element $Z_2$, having contacts 15 which are closed when there is a fault anywhere within a distance which reaches out to beyond the line-terminals 2 and 3, and also a third-zone impedance-element $Z_3$ which closes its contact 16 still more sensitively than the second-zone element, in response to fault-conditions, so that the third-zone element reaches out to faults which are still further away than the second-zone faults. By way of indicating that the second and third-zone elements $Z_2$ and $Z_3$ may not always need to be used, on all transmission-lines, I have indicated the voltage-coils 17 of these elements as being energized from the potential-transformer PT through a switch 19 which may be closed when these second and third-zone elements are to be put into service.

The second-zone contact 15 is serially connected, by means of a conductor 21, between the conductor 11 and a conductor 22, so that the conductor 22 is connected to the negative station-terminal (—) whenever the directional-element contacts 8 and the second-zone contacts 15 are both closed. This circuit 22 is connected to the trip-circuit 12 through the make-contact 23 of a supervisory receiver-relay RR, which is responsive to information received from another line-terminal or terminals, as will subsequently be described. The circuit 22 is also used to energize the operating-coil of an auxiliary relay marked CSP, which has a back-contact 24 which is used to interrupt a transmitter-controlling circuit 25 whenever the circuit 22 is energized by the simultaneous response of the directional element D and the second-zone impedance-element $Z_2$.

The third-zone contact 16 is connected between the negative battery-terminal (—) and a circuit 26. The circuit 26 is used for two purposes: first, it energizes the circuit 25 which contains the CSP back-contact 24, and this circuit 25, in turn, energizes a control-circuit 27 for controlling the transmission of a blocking-impulse, preferably by directed microwave-beams, as indicated by a blocking-wave transmitter $T_2$, which is connected to the antennae $M_2$ and $M_3$. The blocking-wave transmitter $T_2$ transmits its microwave-energy whenever its control-circuit 27 is connected to the negative power-terminal (—) through the circuit 25 including the back-contact 24 of the CSP relay and the make-contact 16 of the third-zone element $Z_3$. When the blocking-signal transmitter $T_2$ is not transmitting, its control-circuit 27 is held to such a high positive potential as to render said transmitter inoperative, by reason of a resistor $R_1$ which connects said control-circuit 27 to the positive battery-terminal (+).

Connected in shunt with the circuit-portion 25 which contains the CSP back-contact 24, there is another circuit 28, which includes the receiver-relay trip-coil RRT and a resistor $R_2$, so that the receiver-relay trip-coil RRT is energized whenever the CSP back-contact 24 is open and the third-zone make-contact 16 is closed; this energizing-circuit being traceable from the negative terminal (—), through the $Z_3$ contact 16, the circuits 26 and 28, the resistor $R_2$, a portion of the circuit 27, the resistor $R_1$, and thence to the positive battery-terminal (+). Under these conditions, with the receiver-relay trip-coil RRT energized through the circuit which has just been traced, the potential of the transmitter-controlling circuit 27 is too positive to cause the blocking-signal transmitter $T_2$ to transmit.

The apparatus also includes a blocking-signal receiver $R_2$, which is also connected to the antenna-means $M_2$ and $M_3$, and which has an output-circuit 30 which energizes a receiver-relay holding-coil RRH.

It will be understood that the transfer-tripping transmitter $T_1$ and receiver $R_1$ are both tuned to the same microwave-frequency, or to the same microwave-tone, in case tone-modulation is used, using the microwave as the tone-carrier. In like manner, it will be understood that the blocking-signal transmitter $T_2$ and receiver $R_2$ are both tuned to the same microwave-frequency or to the same microwave-tone, is different from that which characterizes the transfer-tripping apparatus. I may use microwaves directly, or I may use sub-carriers on a microwave, or tones on a sub-carrier, for transmitting the blocking and transfer-tripping signals: any such combination may be used, as may be required for fitting in with other functions. The only requirement is that there shall be some distinctive communicating channel for communicating information between the several line-terminals. It would also be possible to assign a different frequency to each of the line-terminals, in which case the receivers $R_1$ and $R_2$ would be properly tuned to respond to the waves or tones of the signals which they are designed to receive.

In operation, there are three ways in which the trip-circuit 12 can be energized: first, in response to the first-zone fault-responsive elements including the directional element D and the first-zone impedance-element $Z_1$; second, in response to the terminal-comparison relaying-apparatus comprising the receiver-relay contact 23, the second-zone contact 15, and the directional contact 8; and third, in response to a transfer-tripping impulse which is received, in the circuit 14, from the transmitter corresponding to $T_1$ at one of the other line-terminals such as the terminal 2 or the terminal 3. The transfer-tripping transmitter $T_1$ is energized, through its control-circuit 13, whenever the trip-circuit 12 is energized, thus transmitting a transfer-tripping energization or signal to the circuit corresponding to the circuit 14 at each of the other line-terminals. The receiver-relay RR is energized, closing its contact 23, whenever its tripping-coil RRT is energized without an energization of its holding-coil RRH.

In the event of a fault involving an operation of the terminal-comparison relaying equipment, the third-zone element $Z_3$ closes its contact 16 at least as quickly as, and usually quicker than, the second-zone element $Z_2$ can close its contact 15. Hence, the first effect of the closure of the third-zone contact 16 is to energize the circuits 26, 25 and 27, thereby initiating the operation of the blocking-signal transmitter $T_2$, which instantaneously energizes all of the blocking receiver-circuits 30 at all of the other terminals of the protected line-section, corresponding to the circuit 30 which energizes the holding-coil RRH of the receiver RR. If, subsequently, the circuit 22 becomes energized, the auxiliary relay CSP will be energized, and it will pick up its back-contact 24 which simultaneously interrupts the operation of the blocking-signal transmitter $T_2$ and energizes the trip-coil RRT of the receiver-relay RR. If the blocking-signal transmitters, corresponding to $T_2$, are similarly de-energized at each of the other line-terminals, the blocking-signal receiver-circuit 30 will then become deenergized, thus deenergizing the holding-coil RRH, and permitting the receiver-relay RR to pick up its contact 23, which energizes the tripping-circuit 12.

There are a number of outstanding advantages of my relaying-system using a beamed-microwave communicating-channel. In the first place, the beamed-microwave channel, being independent of the line-section conductors, is independent of faults on the power-line, and hence it can be counted on for tripping the remote terminals during internal faults, as well as being reliable for blocking the tripping of the remote terminals during external faults. In this respect, the beamed-microwave channel partakes of the advantages of pilot wires, as compared to power-line carrier. Theory and experience indicate, however, that the beamed-microwave channel is far more reliable than pilot wires, and it is much less expensive than long-line pilot-wires, which are not economic for use on protected line-sections of unusual length. By beamed microwave, I mean, in general, ultra-short-wave radio, usually having a frequency of the order of 1000 megacycles, more or less, which means a wavelength of the order of 30 centimeters, more or less. In general, microwave-transmission may be regarded as having any transmission-frequency of the order of 10 megacycles or more.

My beamed-microwave protective relaying-system is thus intended to be a substitute for the previously known carrier-relaying systems, both of the phase-comparison and the directional-comparison types, which have heretofore been almost universally of the blocking type, in which carrier was depended upon to block tripping for external faults, rather than to produce tripping for internal faults. Such a blocking arrangement was necessary, in carrier-current relaying, because an internal fault on the protected line might interrupt the carrier-channel. This has worked a severe hardship on the application of protective relays, since it has meant that a discrimination had to be found, between load and fault conditions, at each terminal of the line, in order to secure simultaneous opening of the circuit-breakers at all terminals. This discrimination between load and fault conditions is difficult under many conditions, of which the following are examples:

(a) When there is a large power-source at one end, and only a small power-source at the other end of a two-terminal line-section, the short-circuit current which is fed into the line-section at the second end may be so small as to be difficult of differentiation from the load-currents which may occur either during the same generating-setup, or under some other generating-setup in which there is more connected generator-capacity at the second end. A case in point would be a cart-wheel power-distribution system, in which the main generating-station is at the center, and the lines radiate out therefrom. Around the rim, the generating-stations (if any) are weak, as are also the ties with other systems. For faults near the hub, on any one of the radial lines, fault-current detection is easy at the hub-station, but may be quite impossible at the rim-station, because of lack of any appreciable power-feedback into the fault from the rim.

(b) Some transmission-systems are so grounded that the residual current which flows over a protected line-section does not vary sufficiently with the fault-location to provide any first-zone or instantaneous ground-selection. For example, on very solidly grounded transmission-systems, a ground-fault near one terminal of a protected line-section may draw extremely small ground-current from another terminal.

(c) In multi-terminal protected line-sections, or tapped lines, that is, line-sections having three or more terminals (usually not more than 4 terminals), the mutual effect of current coming in at one terminal and flowing to a fault near a second terminal may make the impedance, as viewed from a third terminal, so high that an internal fault cannot immediately be detected at said third terminal. Or still worse, the impedance which is measured at the third terminal may be enough to start carrier, but not to trip.

(d) Another situation arises, on lines having three or more terminals, in which an internal fault near one terminal causes fault-current to flow out of the protected line-section at a second terminal, thus starting carrier at the second terminal, and preventing carrier-current tripping at all terminals. The best solution of this problem, to date, has been to abandon simultaneous tripping altogether, and to resort to sequential tripping, in which the terminal nearest the fault is first tripped, by means of a first-zone phase-fault or ground-fault element, independent of carrier, thus eliminating the condition which made carrier-current trip inoperative, and then permitting tripping to be obtained at the other terminals. Such sequential tripping is highly undesirable, because it makes it impossible to realize the advantages of high-speed reclosing of the circuit-breakers.

(e) In blocking-type carrier-current systems, it is always desirable to have two carrier-zones, usually known as zones 3 and 2, or as the carrier-starting and tripping zones, respectively. (Zone I is independent of carrier.) A margin is required between these two carrier-zones, in order to secure carrier-starting whenever carrier-current transmission is needed for the purpose of preventing tripping. This margin must maintain a ratio of about 2 to 1, on the current-relays which are used for the ground-elements of nearly all schemes. Furthermore, in the case of ground-relays, the ground-current is so extremely small, during through-fault conditions, that if the carrier-starting current-responsive ground-element is set low enough to pick up on through-fault conditions (as it must), it may also pick up on harmonics or zero-sequence charging-currents. The relay-burden of a current-element which will respond to such small ground-current also becomes a serious problem. The necessity for providing a still further element, set for a still lower current, in a 2-to-1 ratio, makes the problem much more difficult. In the case of phase-relays, the difficulty is one of differentiating loads from faults, as well as the difficulty of distance-discrimination for different distances of faults, which is sometimes impossible on short high-voltage lines.

Carrier-current relaying has other disadvantages, in addition to its inability to be relied upon for transfer-tripping during internal-fault conditions, and its difficulties with respect to the possibility of a reliable discrimination between load and fault-conditions at each terminal of the protected line-section. Thus:

(f) Coupling the carrier-current energy to the line is sometimes expensive, particularly at the higher line-voltages, or when several carrier-current frequencies are required for various purposes, thus requiring multi-frequency tuning and blocking.

(g) Carrier-spectrum crowding may make it difficult to find a carrier-current frequency with adequate spacing for safety from other carrier-channels.

(h) The protected line-section may consist of a cable, or it may include a section of cable, making it difficult, or very expensive, to transmit an adequate carrier-current signal through the protected line-section.

To overcome only some of the above-mentioned difficulties would obviously be an extremely important step, if it could be accomplished without introducing other, and perhaps worse, difficulties. I believe that my beamed-microwave protective-system overcomes substantially all of the above-mentioned difficulties, without introducing any serious difficulties of its own. In particular, I believe that my new microwave relaying-system is far more universally applicable to difficult relaying-situations in general. My microwave relaying-system is particularly applicable to multi-terminal line-sections, on which it will extend the field of high-speed reclosing of circuit breakers, by reliably obtaining simultaneous fault-detection and tripping at all terminals of the protected line-section.

On most transmission-lines, it is possible to detect the occurrence of an internal fault first-zone, that is, independently of other-terminal comparison, at at least some one of the line-terminals, wherever the internal fault may be located within the confines of the protected line-section. Whenever this is possible, my beamed-microwave channel provides instantaneous transfer-tripping at each of the other terminals of the protected line-section, so that each terminal will have a simultaneous indication of the existence of an internal fault, which is to say, that simultaneous circuit-breaker tripping may be obtained at each of the terminals of a protected line-section in which an internal fault occurs. For such systems, other-terminal comparison is not needed, and all that is needed (aside from the microwave transfer-tripping transmitter $T_1$, transfer-tripping receiver $R_1$, and antennae $M_2$ and $M_3$), for my microwave protective-system, is the first-zone fault-discriminating relaying-means, which is symbolized by the directional element D and the first-zone element $Z_1$ in the drawing, which is intended to be representative of any group of phase and ground relays operating from the line-current and the line-voltage at the relaying station.

My other-terminal-comparison system, symbolized by the second and third-zone elements Z2 and Z3, are added in order to make my microwave protective relaying-system universally applicable to practically all transmission-systems, even including the relatively small number of special transmission-systems in which it may not be possible to detect all kinds or locations of internal faults first-zone at at least one of the terminals of the protected line-section. Examples of such special transmission-systems would be, first, a short high-voltage line, which is too short for distance-protection, or second, a line-section on a transmission-system which is so grounded that the value of the residual current in the line-section varies insufficiently with the fault-location to provide any first-zone ground-selection, or third, a tapped-line, which may be such as to prevent first-zone selection of all internal faults thereon. Therefore, in order to provide a practically universally applicable microwave protective-system, I have added the directional-comparison carrier-relays, or their equivalent, to the first-zone fault-detector relays, for use in such cases where their use may be required, as is indicated by the provision of the switch 19.

However, the directional-comparison carrier-relays (including, in this term, my directional-comparison microwave equipment Z2, Z3, $T_2$, $R_2$ and RR) are not always capable of reliably protecting against internal faults, so that it is not feasible to omit the first-zone fault-detecting apparatus. A case in point is the case of multi-terminal lines, in which case the directional comparison, other-terminal-comparison or carrier-current relaying-system is much more universally dependable than the phase-comparison system which is usually limited to two-terminal lines in which the phase of the line-current at one terminal can be compared with the phase of the current at the other terminal; but even in the case of the directional-comparison system, incorrect blocking may occur for some internal faults. Another case in which other-terminal comparison may fail would be the case of a two-terminal line in which the fault-current at one end might be too small to be discriminated from load-currents. Still another example of a case in which other-terminal comparison may fail would be double-circuit tower-lines, in which two-circuit faults are very common, and in which second-zone blocking is quite uncertain and unreliable. It will be noted that my transfer-tripping means is independent of the blocking-signal which is transmitted by the other-terminal comparison-means, so that it is not affected by erroneous operation of the latter.

Past experience has shown—in many cases of practical applications of directional-comparison carrier-relays to different kinds of lines—that wherever incorrect directional-comparison blocking occurs for internal faults, first-zone detection of the fault is possible at at least one of the line-terminals, and wherever first-zone detection is not possible, then second-zone (or directional-comparison) blocking is possible and reliable. Consequently, by one means or the other, that is, by first-zone detection, or second-zone blocking, it is practically universally possible to instantaneously and reliably detect the occurrence of an internal fault within the confines of any protected line-section of an electric-power transmission-system; and hence, with my beamed-microwave transfer-tripping system, it is always possible to obtain a fault-indication, or a tripping-impulse, at each one of the terminals of a protected line-section. I have thus provided a protective-relay system which is more universal, in its application, than any that has hitherto been known.

While I have illustrated my invention, and described its operation and its distinguishing features, with respect to but a single illustrative form of embodiment, I wish it to be understood that such illustration was intended only by way of example, as my invention is obviously susceptible of considerable variation in the way of additions, omissions and the substitution of equivalents. I desire, therefore, that the appended claims shall be accorded the broadest construction consistent with their language.

I claim as my invention:

1. A protective fault-responsive microwave relaying-system for a relaying terminal of a line-section of an electric-power transmission-system, comprising: fault-responsive relaying-means, responsive to a line-current and a line-voltage at said relaying terminal, independently of conditions at any other line-terminal, for selectively determining the existence of an internal fault within the protected line-section; other-fault-responsive relaying-means, dependent upon information received from another terminal of the protected line-section, as well as being dependent upon line-conditions at the relaying terminal, for selectively determining the existence of an internal fault within the protected line-section; said other-fault-responsive relaying-means including means for communicating information concerning line-conditions at the relaying terminal to the other terminal or terminals of the protected line-section; transmitting-means, responsive to a fault-determination, by whatever means it is determined, at the relaying terminal, for transmitting a directed transfer-tripping microwave-beam, independent of the line-section conductors, and having a frequency of the order of 10 megacycles or more, to the other terminal or terminals of the protected line-section; and receiving-means, responsive to a received transfer-tripping microwave-beam coming from another terminal of the protected line-section, for providing a determination of the existence of an internal fault within the protected line-section.

2. A protective fault-responsive microwave relaying-system for a relaying terminal of a line-section of an electric-power transmission-system, comprising: fault-responsive relaying-means, responsive to a line-current and a line-voltage at said relaying terminal, independently of conditions at any other line-terminal, for selectively determining the existence of an internal fault within the protected line-section; other-fault-responsive relaying-means, dependent upon information received from another terminal of the protected line-section, as well as being dependent upon line-conditions at the relaying terminal, for selectively determining the existence of an internal fault within the protected line-section; said other-fault-responsive relaying-means including transmitting-means for transmitting a directed terminal-comparison microwave-beam, independent of the line-section conductors, and having a frequency of the order of 10 megacycles or more, to the other terminal or terminals of the protected line-section; said terminal-comparison microwave-beam containing information concerning said other-fault line-conditions at the relaying terminal; transmitting-means, responsive to a fault-determination, by whatever means it is determined, at the relaying terminal, for transmitting a directed transfer-tripping microwave-beam, independent of the line-section conductors, and having a frequency of the order of 10 megacycles or more, to the other terminal or terminals of the protected line-section; and receiving-means, responsive to a received transfer-tripping microwave-beam coming from another terminal of the protected line-section, for providing a determination of the existence of an internal fault within the protected line-section.

3. A protective fault-responsive microwave relaying-system for a relaying terminal of a line-section of an electric-power transmission-system, comprising: fault-responsive relaying-means, responsive to a line-current and a line-voltage at said relaying terminal, independently of conditions at any other line-terminal, for selectively determining the existence of an internal fault within the protected line-section; other-fault-responsive relaying-means, dependent upon information received from another terminal of the protected line-section, as well as being dependent upon line-conditions at the relaying terminal, for selectively determining the existence of an internal fault within the protected line-section; said other-fault-responsive relaying-means including means for communicating information concerning line-conditions at the relaying terminal to the other terminal or terminals of the protected line-section; transmitting-means, responsive to a fault-determination, by whatever means it is determined, at the relaying terminal, for transmitting a directed transfer-tripping microwave-beam, independent of the line-section conductors, and having a frequency of the order of 10 megacycles or more, to the other terminal or terminals of the protected line-section; and receiving-means, responsive to a received transfer-tripping microwave-beam coming from another terminal of the protected line-section, independently of the other-fault information concerning line-conditions at another terminal or terminals, for providing a determination of the existence of an internal fault within the protected line-section.

4. A protective fault-responsive microwave relaying-system for a relaying terminal of a line-section of an electric-power transmission-system, comprising: fault-responsive relaying-means, responsive to a line-current and a line-voltage at said relaying terminal, independently of conditions at any other line-terminal, for selectively determining the existence of an internal fault within the protected line-section; other-fault-responsive relaying-means, dependent upon information received from another terminal of the protected line-section, as well as being dependent upon line-conditions at the relaying terminal, for selectively determining the existence of an internal fault within the protected line-section; said other-fault-responsive relaying-means including transmitting-means for transmitting a directed terminal-comparison microwave-beam, independent of the line-section conductors, and having a frequency of the order of 10 megacycles or more, to the other terminal or terminals of the protected line-section; said terminal-comparison microwave-beam containing information concerning said other-fault line-conditions at the relaying terminal; transmitting-means, responsive to a fault-determination, by whatever means it is determined, at the relaying terminal, for transmitting a directed transfer-tripping microwave-beam, independent of the line-section conductors, and having a frequency of the order of 10 megacycles or more, to the other terminal or terminals of the protected line-section; said transfer-tripping microwave-beam containing information concerning said fault-determination at the relaying terminal; and receiving-means, responsive to a received transfer-tripping microwave-beam coming from another terminal of the protected line-section, independently of the other-fault information concerning line-conditions at another terminal or terminals, for providing a determination of the existence of an internal fault within the protected line-section.

5. The invention as defined in claim 1, characterized by said other-fault information including information concerning the relative direction of a line-current with respect to a line-voltage at the terminal where said information is originated.

6. The invention as defined in claim 2, characterized by said other-fault information including information concerning the relative direction of a line-current with respect to a line-voltage at the terminal where said information is originated.

7. The invention as defined in claim 3, characterized by said other-fault information including information concerning the relative direction of a line-current with respect to a line-voltage at the terminal where said information is originated.

8. The invention as defined in claim 4, characterized by said other-fault information including information concerning the relative direction of a line-current with respect to a line-voltage at the terminal where said information is originated.

EDWIN L. HARDER.

REFERENCES CITED

The following references are of record in the file of this patent:

UNITED STATES PATENTS

| Number | Name | Date |
| --- | --- | --- |
| 1,702,423 | Wensley | Feb. 19, 1929 |
| 1,930,333 | Bancker | Oct. 10, 1933 |
| 1,987,986 | Bjornson | Jan. 15, 1935 |
| 2,141,896 | Bancker et al. | Dec. 27, 1938 |
| 2,255,934 | Lenehan | Sept. 16, 1941 |
| 2,450,991 | Sanders | Oct. 12, 1948 |
| 2,454,009 | Sanders | Nov. 16, 1948 |
| 2,472,136 | Whitloch | June 7, 1949 |
| 2,474,527 | Heisner | June 28, 1949 |